May 20, 1952  C. L. DAY ET AL  2,596,987
MIXING APPARATUS AND METHOD

Filed Nov. 12, 1949  10 Sheets-Sheet 2

INVENTORS:
Carl L. Day,
Leo F. Pahl,
BY Cushman, Darby & Cushman
ATTORNEYS

May 20, 1952  C. L. DAY ET AL  2,596,987
MIXING APPARATUS AND METHOD
Filed Nov. 12, 1949  10 Sheets-Sheet 3

INVENTORS:
Carl L. Day,
Leo F. Pahl,
BY Cushman, Darby & Cushman
ATTORNEYS.

May 20, 1952     C. L. DAY ET AL     2,596,987
MIXING APPARATUS AND METHOD

Filed Nov. 12, 1949     10 Sheets-Sheet 5

INVENTORS:
Carl L. Day,
Leo F. Pahl,
BY Cushman, Darby & Cushman
ATTORNEYS.

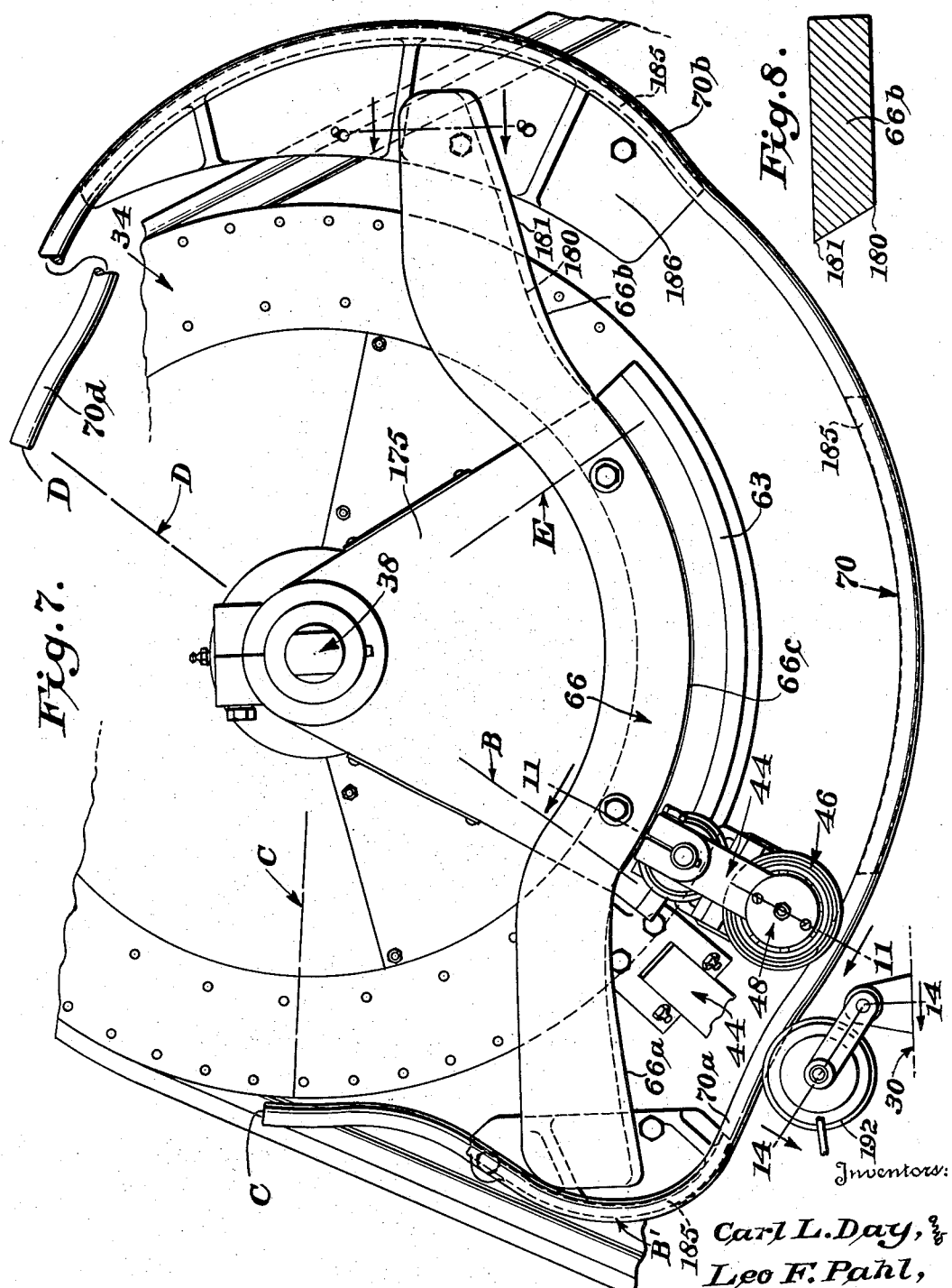

May 20, 1952 C. L. DAY ET AL 2,596,987
MIXING APPARATUS AND METHOD
Filed Nov. 12, 1949 10 Sheets-Sheet 7
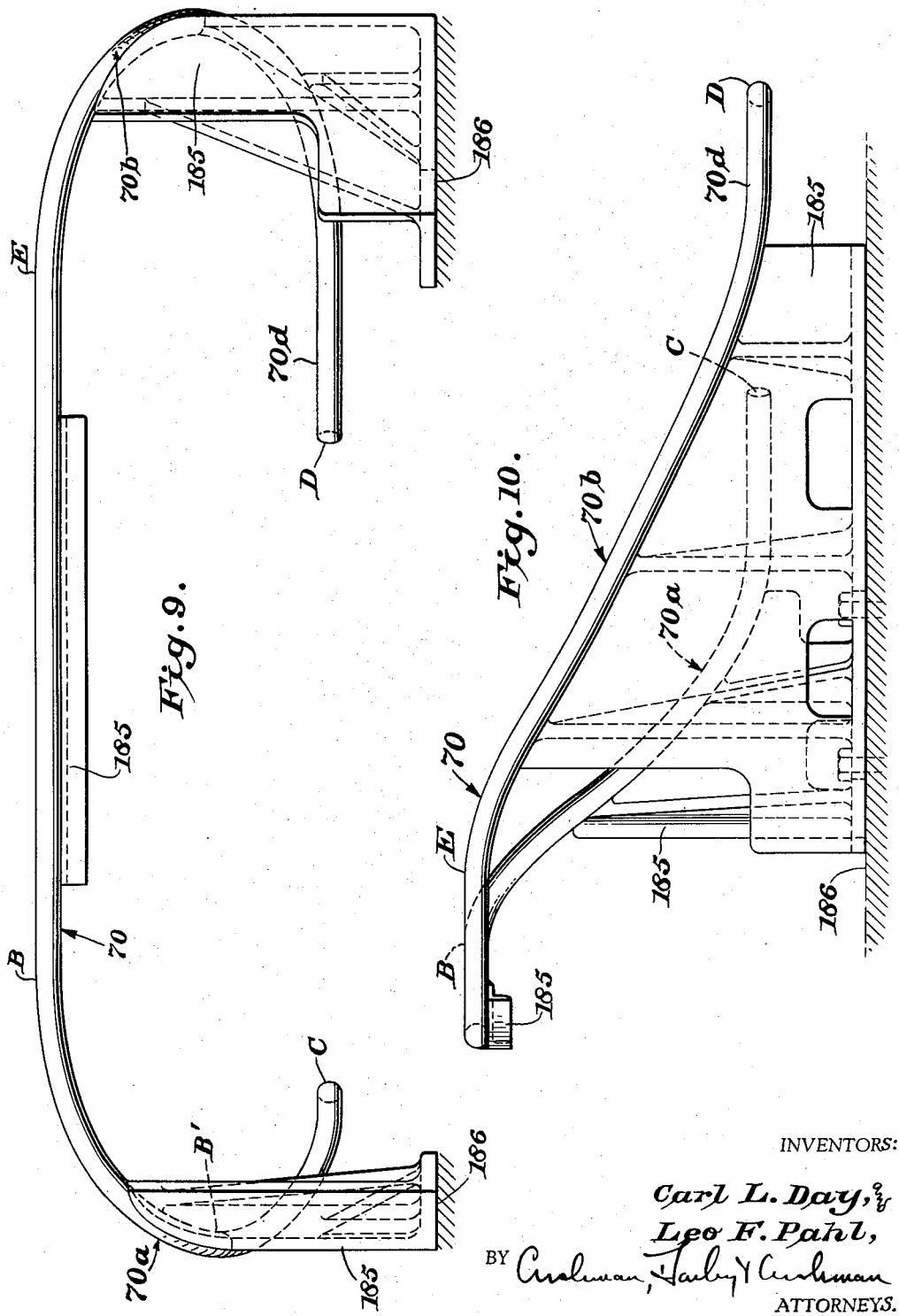
INVENTORS:
Carl L. Day,
Leo F. Pahl,
BY Cushman, Darby & Cushman
ATTORNEYS.

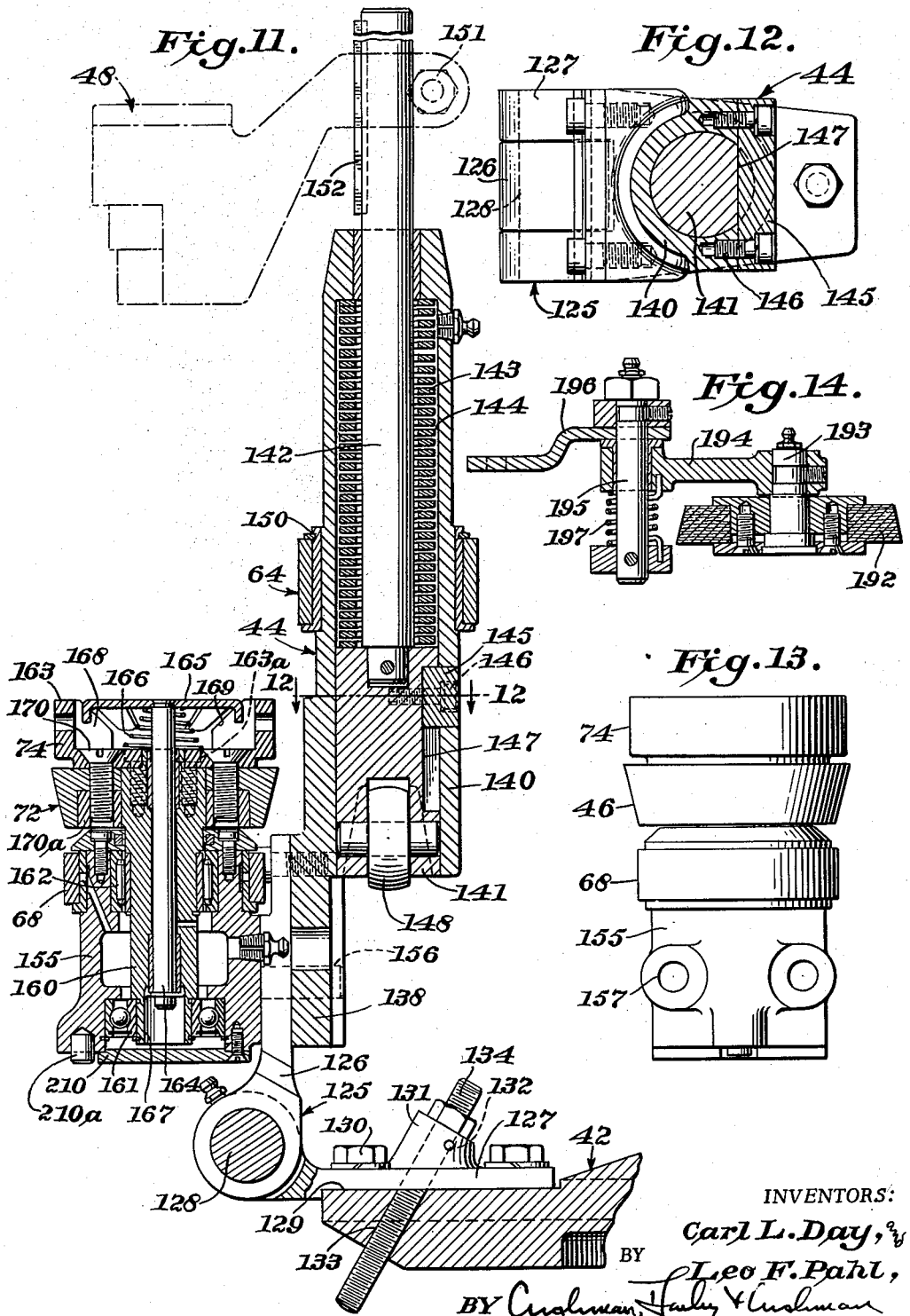

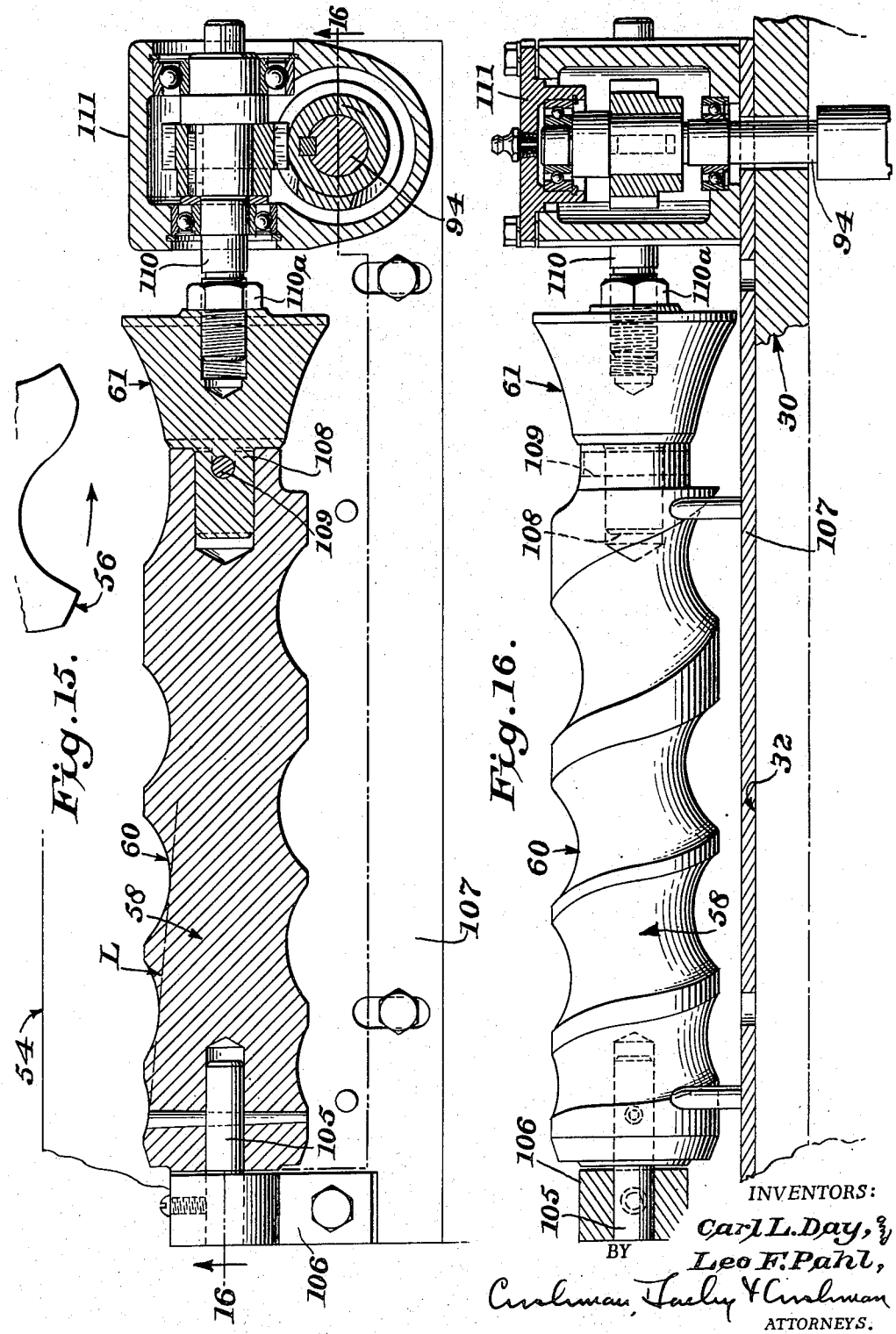

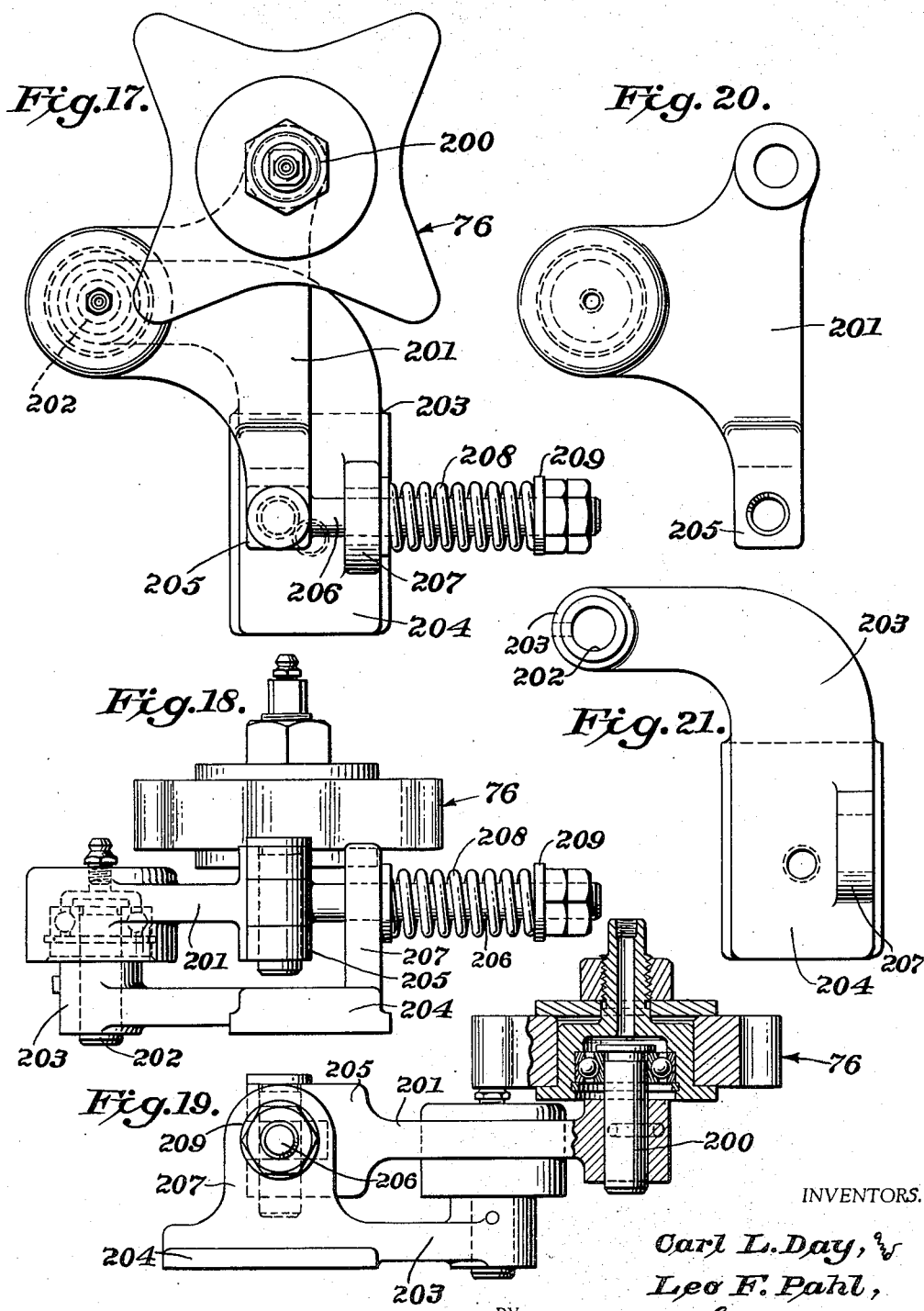

Patented May 20, 1952

2,596,987

UNITED STATES PATENT OFFICE 2,596,987

MIXING APPARATUS AND METHOD

Carl L. Day and Leo F. Pahl, Baltimore, Md., assignors to Crown Cork & Seal Company, Inc., Baltimore, Md., a corporation of New York Application November 12, 1949, Serial No. 126,731

23 Claims. (Cl. 259—54)

The present invention relates to mixing apparatus and methods and, more particularly, to an apparatus for mixing beverages such as "soft drinks" in the bottles or other containers in which the beverages are sold.

The invention is an improvement upon that of George W. Newton Patent No. 2,216,090, issued September 24, 1940.

An object of the invention is to provide an arrangement whereby the container supports of a mixing apparatus will be smoothly and accurately moved from upright position to inverted position and through a reverse movement while the container supports are moving at high speed with the rotary table upon which they are pivoted.

Another object of the invention is the provision of an apparatus and method whereby thorough mixing of the syrup and carbonated water in a container will be effected.

An additional object is the provision of an improved drive for a mixing apparatus.

Another object of the invention is to provide an improved form of container support in which a container may be moved between upright position to inverted position and spun about the container axis.

A further object of the invention is to provide means for applying lubricant to a cam surface which controls the tilting movement of the container supports as well as to the contacting surfaces which effect spinning of the container support.

A still further object is to provide an improved arrangement for delivering containers in properly spaced apart position to the infeed dial of a container handling apparatus.

Other objects and advantages of the invention will be apparent from the following specification and accompanying drawings wherein:

Figure 7 is a top plan view of the container support tilting cams of the machine, the view omitting other elements which would normally appear therein.

Figure 8 is a detail sectional view on the line 8—8 of Figure 7.

Figure 9 is a detail view showing the outer cam for tilting the container supports, the view being taken looking toward the lower edge of Figure 7.

Figure 10 is another view of the cam illustrated in Figure 9, Figure 10 showing the cam as it appears when Figures 7 or 9 are viewed from the right.

Figure 11 is a vertical section of a container support taken on the line 11—11 of Figure 7.

Figure 12 is a horizontal section on the line 12—12 of Figure 11.

Figure 13 is an elevation of the lower clamping member of a container support, the view looking toward Figure 11 from the left.

Figure 14 is a detail sectional view of a lubricant applying device, the view being taken on the angled line 14—14 of Figure 7.

Figure 15 is a horizontal axial section of a container spacing device included in the invention.

Figure 16 is a detail view of the container spacing device, the view being taken on the angled line 16—16 of Figure 15.

Figure 17 is a plan view of a brake device to stop spinning movement of containers.

Figure 18 is an elevation of the Figure 17 device, Figure 18 showing the device of Figure 17 as viewed from the lower edge of the latter figure.

Figure 19 is an elevation of the Figure 17 device, with parts in vertical section, the view being taken looking toward Figures 17 and 18 from the right; and Figures 20 and 21 are detail elevations of the device of Figures 17 to 19.

Figure 1:
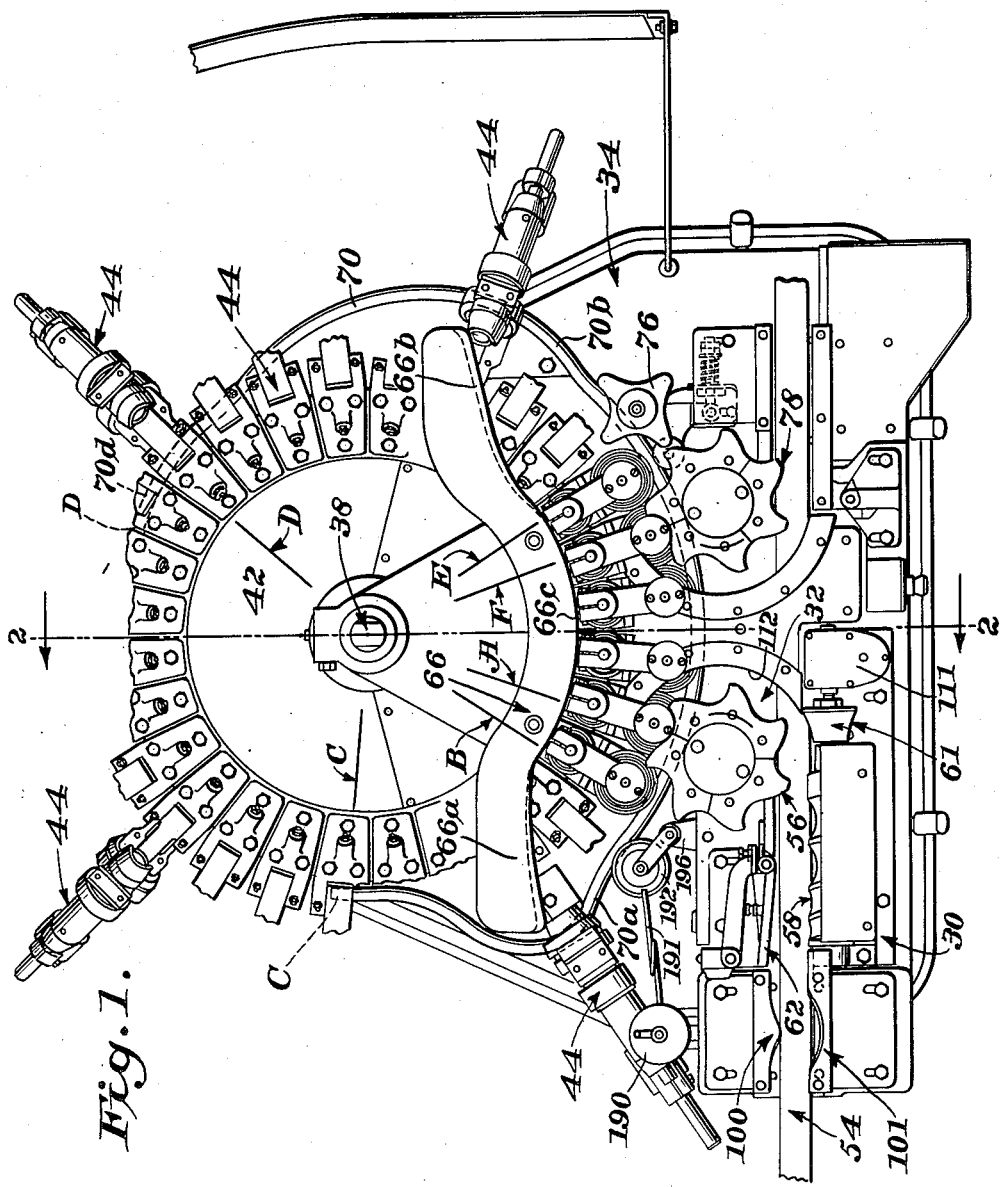
Figure 1 is a plan view of the machine, with some of the container supports omitted.
Figure 2:
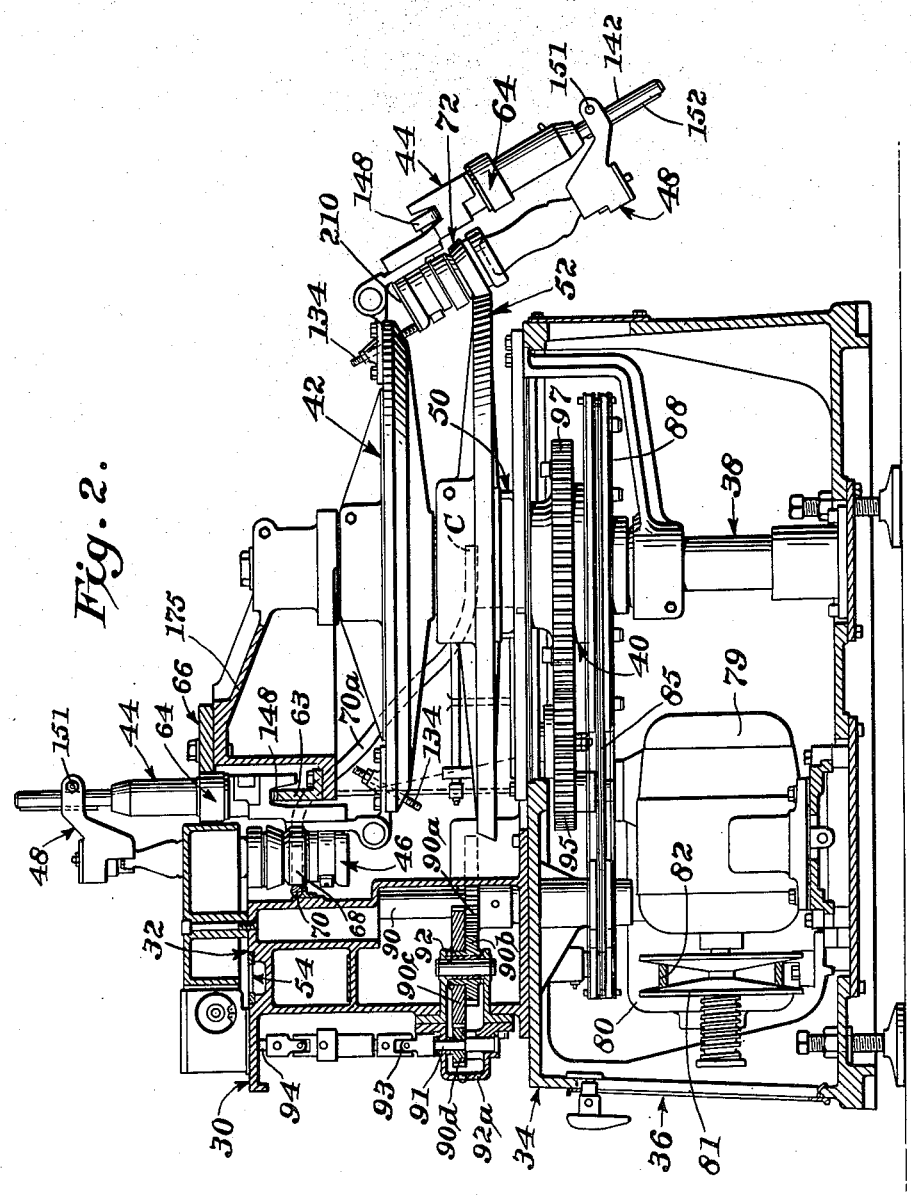
Figure 2 is a vertical sectional view on the line 2—2 of Figure 1, the view omitting some of the container supports.

The construction and operation of the apparatus of the present invention may be generally described as follows: Referring to Figures 1 and 2, the apparatus comprises a work table 30 including an upper horizontal surface 32, the table extending upwardly from the front portion of a base 34. Base 34 includes a housing 36 below and extending rearwardly from table 30 in which the driving mechanism of the machine is mounted. A post 38 fixed in the lower wall of housing 36 extends upwardly through the housing and has a tubular shaft 40 journalled thereon, shaft 40 having a rotary table 42 fixed to its upper end. Table 42 has a number of container supports 44 pivoted at its edge for movement radially of the table. Each container support 44 includes a lower rotatable container engaging member 46 and an upper cap engaging member rotatable in a clamping arm 48.

A second or outer tubular shaft 50 surrounds and is journalled upon the tubular shaft 40, shaft 50 having a spinning disk 52 fixed to its upper end and below rotary table 42. Shaft 50 is rotated at a substantially higher speed than shaft 40.

Figure 5:
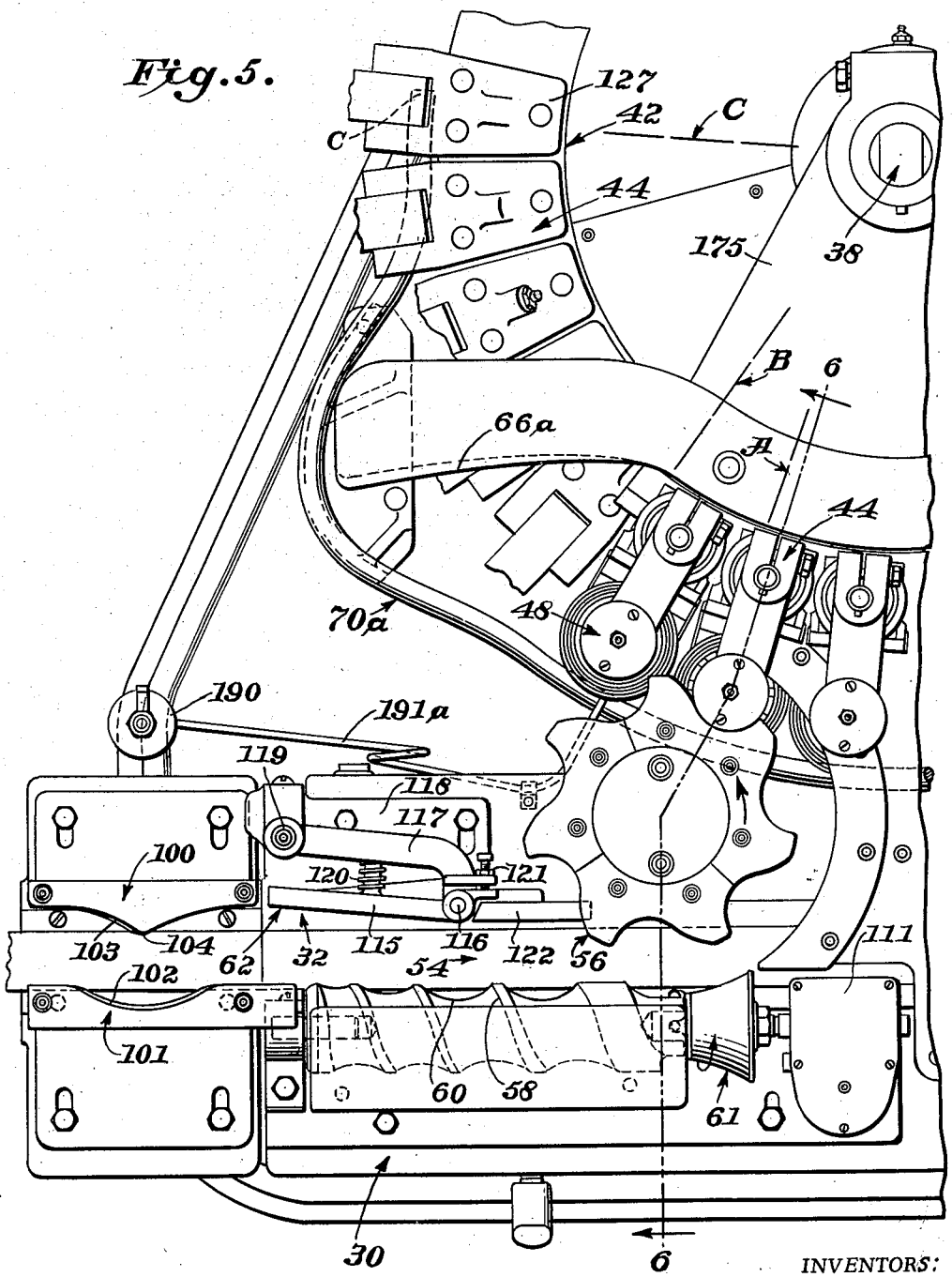
Figure 5 is an enlarged detail showing the infeed side of the forward portion of the machine in plan, some of the container supports being broken away.

As best shown in Figure 5, capped bottles filled (for example, with syrup and carbonated water) will be delivered to the machine by a straight line conveyor 54 having its upper run flush with the upper surface 32 of work table 30. These bottles will contain a lower layer of syrup and a body of carbonated water lying above the syrup. A six ounce bottle usually will contain one ounce of syrup and five ounces of carbonated water. Conveyor 54 moves the bottles toward a pocketed infeed dial 56 and in order to space the bottles in accordance with the spacing of the dial pockets, a bottle spacing cylinder 58 is driven to rotate about a horizontal axis parallel to the direction of movement of conveyor 54. Cylinder 58 is provided with a generally helical recess or thread 60 (Figures 15 and 16) which is of increasing pitch toward its outfeed end so that, as bottles move with the cylinder, they will be gradually spaced apart to mesh with the pockets of dial 56. At its outfeed end, cylinder 58 includes a non-threaded member 61 which is curved concentrically with dial 56 to conform to the path of that dial. Hence, bottles will be smoothly directed from the rectilinear path they follow with conveyor 54 to the arcuate path of the dial.

Conveyor 54 is driven at such speed with respect to cylinder 58 that it will urge bottles forwardly against the leading surface of the recesses 60. Also, cylinder 58 rotates at such speed that bottles moving along its outfeed portion will have the same linear speed as the pockets of dial 56. Hence, transfer of bottles to the dial will be effected smoothly and without undue noise or marring of the bottles.

In order that the helically recessed cylinder 58 will smoothly receive bottles which may be crowded together in a line on conveyor 54, its recess 60 is of zero depth at its infeed end and gradually increases in depth toward its outfeed end. In other words, the root diameter of helical recess 60 gradually decreases. As a result, the base line of the thread lies on an angle of about 6° to the line of movement of conveyor 54 throughout at least the major portion of the length of cylinder 58. A spring-pressed guide member or jam detector 62 at the opposite side of conveyor 54 also normally lies on a line at about 6° to the line of travel of conveyor 54. Thus, the inner or bottle engaged surface of guide member 62 will lie parallel to the above-mentioned line formed by the root diameter of thread 60. As is hereinafter explained, this arrangement provides a smoother infeed of bottles to helically recessed cylinder 58 than is the case where the root diameter is uniform.

Guide member 62, being spring-pressed to the position shown in Figure 5, may swing backwardly or away from conveyor 54 and cylinder 58 in the event bottles became jammed opposite it. A certain degree of such movement will cause the guide member to actuate a switch to stop the machine so that a serious jam may be cleared by hand.

Figure 6:
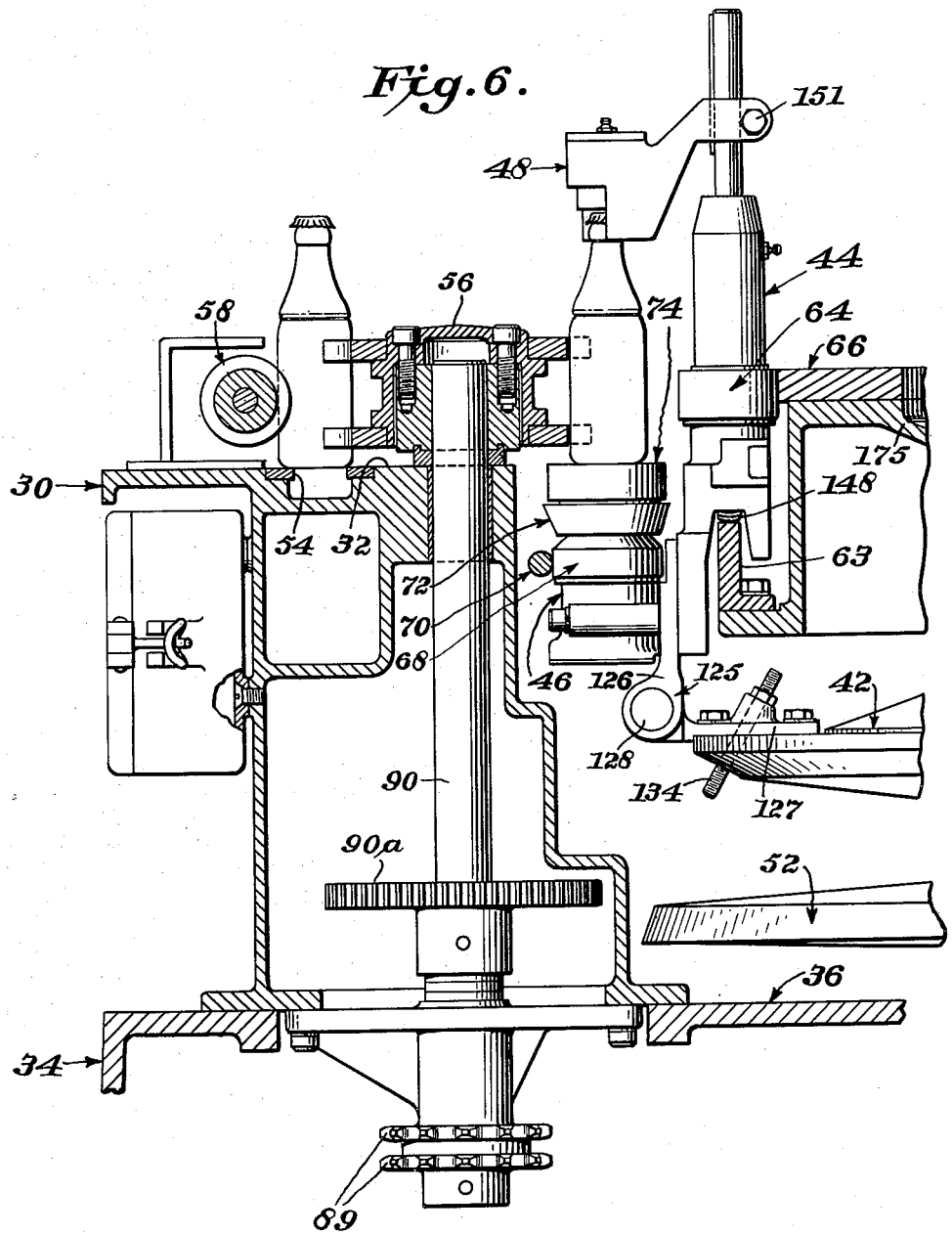
Figure 6 is a vertical section on the angled line 6—6 of Figure 5.

Dial 56 will position the bottles upon the container supports 44 as best illustrated in Figure 6. At the instant that a bottle is received by a container support 44, the container support will be substantially on the radial line A of Figures 1 and 5. At this instant, the clamping arm 48 of the container support will be in raised position because of the action of a cam 63 fixed with respect to the post 38. Immediately thereafter, cam 63 will permit clamping arm 48 to descend by spring action to firmly clamp the bottle in the container support.

With table 42 rotating in a clockwise direction, when a container support reaches the radial line B of Figures 1, 5 and 7, the engagement of a roller 64 (Figure 6) upon the container support with a cam plate 66 fixed with respect to post 38 will cause the container support to begin outwardly and downwardly tilting movement with respect to table 42. A roller 68 on the container support will also follow the portion 70a of a helical cam rod 70 which cooperates with cam 66 to guide the downwardly tilting movement of the container support. As is best indicated in Figures 9 and 10, the portion 70a of cam rod 70 drops sharply so that the container will be rapidly moved from upright to inverted position.

After roller 64 moves off cam plate 66, roller 68 will still bear on the portion 70a of cam 70 and the latter cam will thereby finally control the downwardly tilting movement of the container support and bottle until the container support reaches line C of Figures 1, 5 and 7. Then the container support and bottle will be in the substantially inverted position illustrated at the right of Figure 2 and a spinning wheel 72 included in the container support will come into contact with the spinning disk 52. When the bottle tilts, the syrup at the bottom of the bottle flows down one inner side of the bottle toward the capped end of the bottle. Because of the sharp drop in portion 70a of cam 70, the movement of the bottle to the position in which spinning starts will occur before the syrup reaches the capped end of the bottle. Thus, the syrup is still distributed along the length of the bottle when spinning starts. We have found that this method, viz., starting spinning before the syrup reaches the capped end of the bottle, causes the syrup and water to be thoroughly mixed throughout the length of the bottle within a minimum time. On a machine including twenty-eight container supports 44 and operating to handle approximately one hundred and fifty six-ounce bottles per minute, disk 52 will rotate at sufficient speed to spin the bottles at approximately 2,000 revolutions per minute.

The driven spinning will continue for about seven seconds and while the container support is moving through approximately 105° of the rotation of the table 42. Then the roller 68 will contact, on line D (Figures 1 and 7), with the rising portion 70b of cam rod 70 shown at the right in Figures 1 and 9 also in Figure 10. Hence, the container support will be swung upwardly toward upright position. The container support will reach upright position at approximately the radial line E of Figures 1, 7, 9 and 10. Immediately thereafter, a cylindrical surface 74 (Figures 6 and 11) forming part of the container support will come into contact with a dial-shaped and rotatable braking element 76 (Figures 1 and 17 to 19). This engagement will cause the rotatable bottle carrying portion of the bottle support to cease rotation. However, the contents of the bottle will still continue to spin with respect to the now stationary bottle. Immediately thereafter, cam 63 (Figures 2 and 6) will cause the clamping arm 48 to be lifted so that the bottle will stand freely upon container support 44. When the container support reaches the radial line F of Figure 1, the bottle will be engaged by the outfeed dial 78 which will move the bottle to the outfeed portion of the straight line conveyor 54.

The detailed construction and operation of the machine is hereinafter set forth.

Machine drive

Figures 3, 4:
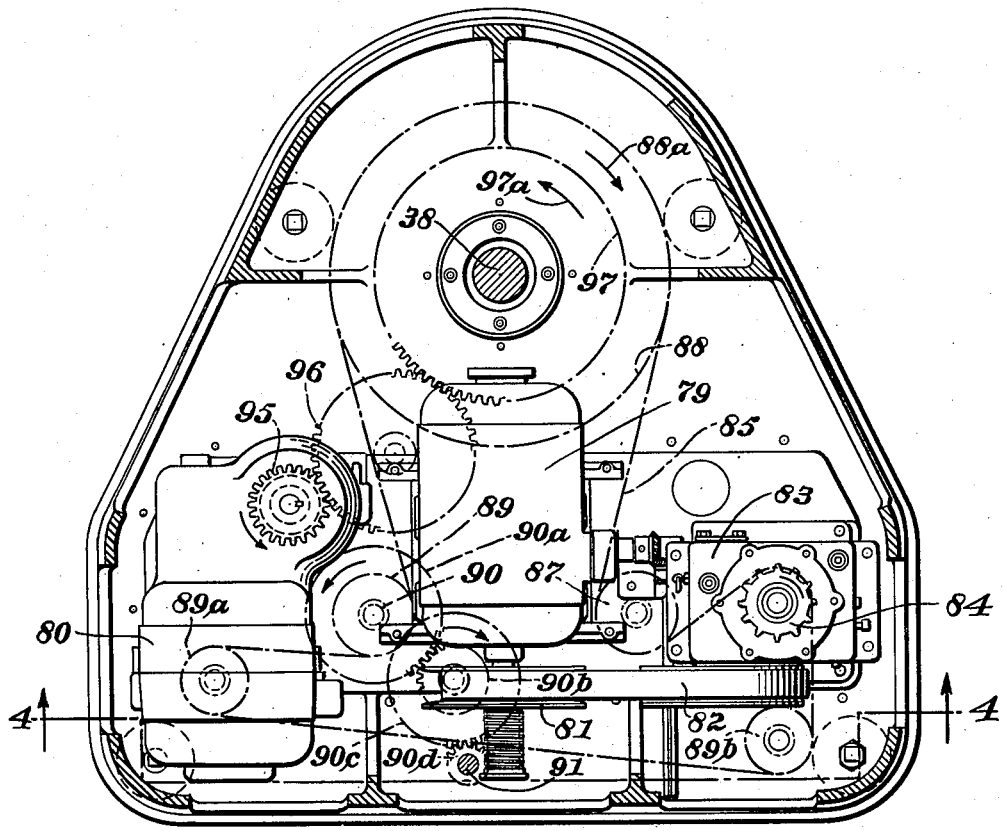
Figure 3 is a horizontal section on the line 3—3 of Figure 4 with the drive diagrammatically shown.
Figure 4 is a vertical section of the lower portion of the machine, the view being taken on the line 4—4 of Figure 3.

As is illustrated in Figures 2 to 4, the machine includes two electric motors 79 and 80. As is hereinafter explained, motor 80 drives the spinning disk 52 and motor 79 drives the remaining driven elements of the machine.

Motor 79 has its shaft equipped with a Reeves drive 81 from which a belt 82 extends to a speed reducing unit 83. The driven shaft of unit 83 carries a sprocket 84 which drives a sprocket chain 85. Sprocket 84 may be connected to unit 83 through a toothed overload clutch 86.

As illustrated in Figure 3, sprocket chain 85 passes about a sprocket wheel 87 fixed to the shaft which carries the outfeed dial 78 and then extends about a large sprocket wheel 88 fixed to the collar 40 to which rotary table 42 is secured. Chain 85 also passes about a sprocket wheel 89 secured to the shaft 90 to which the infeed dial 56 is fixed. Then the chain passes about an idler sprocket 89a which may be adjustably mounted to take up tension in the chain. A run of the chain then extends across the front portion of housing 36 to an idler sprocket 89b and back to the sprocket 84 of the speed reducer unit 83.

It will be observed from the above that sprocket chain drives the rotary table 42 and the infeed and outfeed dials 56 and 78. It will also be noted that the axis of the rotary table and those of the dials are arranged at the apices of a triangle with the idlers 89a and 89b the driving sprocket 84 lying outside of that triangle.

The bottle spacing cylinder 58 is driven from speed reducer unit 83 and motor 79 by the following arrangement: A pinion 90a fixed to the infeed dial shaft 90 meshes with a small pinion 90b carried by a vertical stud carried by a small housing 92 removably secured to the front wall of the base of the machine. As is shown in Figures 2 to 4, a large gear 90c fixed to pinion 90b meshes with a pinion 90d fixed to a vertical shaft 91 journalled in a recessed plate 92a forming part of housing 92. If the machine is to have a different number of container supports 44 than the machine under consideration, spacing cylinder 58 can be driven at the proper speed by substituting another housing 92 with a gear train of proper relation.

Shaft 91 of housing 92 is connected by swivel couplings 93 to a vertically extending stub shaft 94 which, as hereinafter explained, drives the bottle spacing cylinder 58.

Referring now to the motor 80, (Figure 3) which drives the spinning disk 52, this motor rotates a horizontally arranged pinion 95 which meshes with a gear 96 and the latter engages a large gear 97 secured to the collar 50 to which the spinning disk 52 is fixed. It will be observed from the arrow 88a of Figure 3 that with the rotary table 42 rotating in a clockwise direction, the spinner disk gear 97 preferably will rotate in a counterclockwise direction as indicated by the arrow 97a.

Container infeed

As is best illustrated at the lower left of Figure 5, the infeed mechanism of the machine includes a bottle stop device generally designated 100 arranged in the path of entry of containers to the machine. Stop device 100 comprises an outer plate 101 having its inner face 102 concave and positioned alongside and above conveyor 54. A second plate 103 has its inner face convex to an apex 104 and positioned above the opposite edge of conveyor 54. The two plates 101 and 103 are adjustable toward and away from each other by means of bolt and slot connections to table 30 so as to accommodate runs of upright bottles of various sizes.

Bottles in upright position will pass freely between the plates 101 and 103, though their path will be slightly offset during such travel. However, if a bottle falls over on conveyor 54 to lie lengthwise of the conveyor, such bottle cannot get between plates 101 and 103. Hence, the bottle will lie there for removal by the attendant. It will be observed that stop device 100 thereby prevents an overturned bottle from reaching a position between bottle spacing cylinder 58 and dial 56, where it might be broken.

Referring to Figures 15 and 16, the bottle-spacing cylinder 58 is provided at its infeed end with an axial pin 105 journalled in a bracket 106 extending upwardly from a plate 107 adjustably mounted on the upper surface 32 of work table 30. The opposite end of cylinder 58 is axially recessed to fit a stud 108 extending from the adjacent end of the bottle guiding element 61. A diametrical pin 109 in stud 108 fits in notches in the end of cylinder 58. Element 61 is threadably secured to a horizontal shaft 110 journalled in a gear box 111 also fixed to plate 107. A nut 110a holds element 61 in proper adjustment on shaft 110. Within gearbox 111, shaft 110 is suitably geared to the vertical shaft 94 driven from infeed dial shaft 90.

If cylinder 58 is to be replaced for any reason, bracket 106 will be removed so that the cylinder can be disconnected from stud 108. A new cylinder will usually be properly timed with dial 56 by engagement of its notches with pin 109. If adjustment is required, nut 110a can be loosened, element 61 and cylinder 58 can be rotated with respect to shaft 110, to properly position the cylinder with respect to infeed dial 56, and nut 110a then locked.

The bottle spacing cylinder 58 is provided with a helical recess 60 formed on a series of pitches which successively increase from the infeed or left-hand end (Figures 15 and 16) of the cylinder to the opposite and outfeed end of the cylinder. At the extreme infeed end of the cylinder, the recess 60 is of zero depth radially of the cylinder, but it gradually increased in radial depth to a point approximately two-thirds of the length of the cylinder. From that point to the outfeed end of the cylinder, the recess preferably is of uniform depth. Stated another way, considering the cylinder as a threaded element, the minor or root diameter of its thread gradually increases from zero at its infeed end to a point about two-thirds of the length of the cylinder and from that point onward, the minor diameter is uniform.

As is best indicated in Figure 15, the outfeed end of cylinder 58 is positioned at the point at which bottles will be engaged by a pocket of infeed dial 56. The bottles will then move along a curvilinear path with the dial and under the guidance of the curvilinearly conical frustum or guide member 61. Member 61 has its curved periphery generated by a line which is concentric with the axis of dial 56. A fixed and arcuate guide plate 112 (Figure 1) extends from the outfeed end of the member 61 and about the dial 56 to further guide the movement of the bottles with the dial and across the top surface 32 of work table 30.

Again referring to Figure 5, the guide member or detector 62 is mounted above the inner side of the container conveyor 54 immediately adjacent the outfeed end of the inner deflecting plate 103. Guide 62 includes a vertically arranged plate 115 pivotally mounted at 116 upon the end of a lever 117 fixed to the upper end of a vertical shaft 119 journalled in a plate 118 adjustably secured to work table surface 32. Not shown, but below table 30, the lower end of shaft 119 has a radial arm fixed thereto. The top surface of the end of the arm is inclined upwardly from one longitudinal edge thereof and the latter edge is normally alongside the lower surface of the downwardly facing and vertically operable push button of a limit switch. A spring connected to the just-mentioned arm normally holds shaft 119 in such position that the arm will be out of engagement with the push button. However, if a jam of containers forces lever 117 counterclockwise from the position shown in Figure 5, the arm will sweep under the push button to lift it and thereby actuate the switch to stop the machine.

A spring 120 positioned between plate 115 and lever 117 normally urges plate 115 to the position illustrated at Figure 5 wherein its free end will be in alignment with the outfeed end of the guide plate 103. As indicated by the numeral 121, a stop device limits movement of plate 115 inwardly beyond this position with respect to lever 117. The provision of the spring connection between plate 115 and lever 117 permits containers to slightly swing the plate without moving lever 117. Any counterclockwise movement of lever 117 will actuate the push button below table 30 to stop the machine.

It will be observed from Figure 5 that the surface of plate 115 which bottles will engage lies at an angle of approximately 6° to the direction of movement of the conveyor 54. It will also be noted that this surface of the plate normally lies parallel to the dotted line L indicated in Figure 15 and which passes through the bases of the portion of the helical recess 60 which is of gradually increasing depth. In other words, plate 115 coacts with the gradually deepened portion of recess 60 so as to guide and hold bottles toward the base of the recess. A guide plate 122 (Figure 5) fixed to the adjustable plate 118 extends from the pivoted end of detector plate 115 to a point adjacent dial 56 to cooperate with the uniform depth portion of recess 60 in directing bottles toward dial 56.

In the operation of the infeed mechanism described above, bottles delivered to the machine by continuously moving conveyor 54 may accumulate on the conveyor to the left of the stop device 100. As each bottle is moved through the stop device 100, the bottle will slide along plate 115 so that the bottle will be engaged by the infeed end of the recess 60 in cylinder 58. Rotation of the cylinder will enable the bottles to move further toward dial 56 under the control of the recess 60. In more detail, cylinder 58 is rotated at such speed as compared to the speed of travel of conveyor 54 that the cylinder holds the forward movement of the bottles to a slightly lower linear speed than is imparted to them by the conveyor 54. This insures that the bottles will bear upon the leading portion of the recess 60, which portion is so designed that a bottle in engagement therewith will leave the cylinder 58 in synchronism with the pockets of dial 56. As soon as a bottle is fully engaged with a pocket of dial 56, the bottle will be clear of the recess 60 for movement with the dial.

The provision of a helically recessed cylinder with the infeed portion of the recess of gradually increasing depth greatly reduces the possibility of bottles becoming jammed. In more detail, if a threaded infeed device having a uniform root diameter is used, bottles may become jammed when they first contact with the infeed end of the threads. For instance, a bottle may become jammed between the periphery of the thread and an opposed guide plate, the jam increasing as the device rotates to bring a higher thread portion against the bottle. By having the recess 60 of gradually increasing depth and with the guide plate or detector lying on a line parallel to the base diameter of this portion of the recess, the possibility of jamming is minimized.

Because all of the elements included in the infeed device are adjustably mounted on the work table 30, they can readily be secured in position to handle bottles of various sizes. The provision of flexible couplings in the connections to the shaft 94 which drives cylinder 58 permits drive of the cylinder to be maintained in any adjusted position. It will be understood that the various elements will normally be spaced apart by a distance very slightly greater than the diameter of the portion of the bottle with which they contact. The dial 56 is removable so that bottles of different sizes may be handled on the machine by substitution of a dial having the proper sized pockets for such bottles.

*Container supports and tilting cams*

Referring to Figures 6 and 11, each container support 44 includes a hinge 125 comprising two plates 126 and 127 pivotally joined by a pin 128. The hinge plate 127 of each container support is fixed to the upper peripheral edge portion 129 of table 42 by means of suitable machine screws indicated at 130. As appears in Figure 5, the plates 127 lie closely adjacent to each other. Each plate includes an upwardly extending central boss 131 shown in Figure 11. A threaded bore 132 in the boss is inwardly inclined with respect to the axis of the table to be aligned with a bore 133 adjacent the edge of the table. A threaded rod 134 is screwed into threaded bore 132 in such position that its lower end will limit downward movement of the container support with respect to table 42 as hereinafter described. Rod 134 will be secured in adjusted position by means of a lock nut bearing upon boss 131.

As is also shown in Figure 12, the plate 126 of hinge 125 is secured to a plate depending from a cylinder 140. A plunger 141 is mounted in the lower end of cylinder 140 and the upper end of plunger 141 has a rod 142 extending therefrom and through an opening in the outer end of the cylinder. Plunger 141 and rod 142 are normally urged inwardly with respect to cylinder 140 by a coil spring 143 positioned in the bore 144 of the cylinder and bearing upon the plunger 141. Plunger 141 is held against rotation in cylinder 140 by the provision of a key plate 145 secured in a slot in the cylinder by means of machine screws 146 as illustrated in Figure 12. The inner face of plate 145 bears against a flat 147 on plunger 141. Contact of the ends of the flat 147 with key plate 145 also limits axial movement of the plunger and rod with respect to the cylinder. At its inner end, plunger 141 carries a roller 148 adapted to engage the cam 63 as best illustrated in Figure 6. The roller sleeve 64 (Figure 11) which is adapted to engage the plate or inner tilting cam 66 is rotatably mounted about the cylinder 140 in a suitable bearing collar 150.

The outer end of rod 142 has the clamping head 48 adjustably secured thereto by means of a bolt 151. The clamping head is held against rotation about rod 142 by means of a key 152. Clamping arm 48 is of the type disclosed in said Newton Patent No. 2,216,090 and includes means rotatable with respect to the clamping arm and adapted to engage the cap of a bottle so that the bottle will be free to rotate with respect to the clamping arm.

As shown in Figures 11 to 13, the lower clamping element 46 of each container support 44 includes a cylindrical housing 155 which is secured to the hinge plate 126 and the depending plate 138 of cylinder 140 by means of machine bolts such as 156 extending through bores 157 in the housing. A short tubular shaft 160 is journalled centrally of the housing 155 in bearings 161 and 162. The outer end of shaft 160 has a hollow cup 163 secured thereto by machine screws 163a. A pin 164 extends through the central bore of shaft 160 and a bottle-supporting plate 165 is fixed to the end of pin 164 within cup 163. A spring 166 positioned between the underside of plate 165 and the lower surface of cup 163 normally urges plate 165 to the position illustrated in Figure 11. A washer held in place by a machine screw 167 at the inner end of pin 164 limits the movement which spring 166 can apply to the pin and plate. As is described in George W. Newton and Paul R. Powell Patent No. 2,273,761 issued February 17, 1942, plate 165 is provided with peripheral notches which laterally engage shoulders 168 within cup 163. The shoulders and notches hold the plate against rotation and the surfaces 169 of the shoulders are downwardly inclined toward the center of the cup to thereby serve to center bottles on plate 165 when the latter is depressed.

A wheel 72 formed of friction material is secured to the underside of cup 163 by means of bolts 170 which pass through wheel 72 and into a ring 170a recessed in the wheel. Wheel 72 has its periphery tapered as shown in Figure 11 to thereby properly engage the spinning disc 52. The outer surface 74 of cup 163 is adapted to engage braking dial 76 shown in Figures 1 and 14 to 21.

If a friction wheel 72 becomes worn, it can be removed and replaced by unthreading screw 167 at the inner end of shaft 164, so that the shaft, plate 165 and spring 166 can be removed. Then it is only necessary to remove the screws 163a and 170 so that cup 163 and wheel 72 will be free.

The roller 68 of each container support 44 is suitably journalled on the housing 155 below the wheel 72. Roller 68 is adapted to engage the outer helical cam 70 of Figures 2 and 6. It will be observed that roller 68 is rotatably independent of the wheel 72 and the roller or band 74, and only the last-mentioned elements will necessarily rotate with a bottle clamped in a container support.

Referring to Figures 5 to 7, the cam plate 66 is fixed to the outer portion of an arcuate casting 175 which extends forwardly from the central fixed post 38 above rotary table 42. As is best illustrated in Figure 7, the central portion 66c of cam 66, viz., the portion between points on the lines B and E, is concentric with the axis of rotary table 42. As best indicated in Figure 6, the cam surface of this central portion of the cam lies in a vertical plane. Outwardly of each of the lines B and E laterally projecting portions 66a and 66b of cam 66 have their cam surfaces inclined with respect to the vertical, this inclination gradually increasing to the free end of the cam. For example, Figure 8 shows the inclination of the surface at the extreme end of the infeed end of laterally projecting portion 66b and it will be observed that the lower edge 180 is substantially inwardly of the upper edge 181. These outward portions 66a and 66b of cam 66 are, in plan, respectively very slightly concave and very slightly convex.

Figures 6 and 7 illustrate the cam 63 which controls the lifting of the clamping arm 48 of each container supports 44 and which is also mounted on the casting 175. Cam 63 is of full height between the lines A and F of Figure 1 but gradually decreases in height beyond those points and toward the lines B and E, respectively.

Figures 7, 9 and 10 best illustrate the form of the helical or outer cam rod 70, which is preferably circular in cross section throughout its length. Figure 7 shows the cam rod 70 in top plan, and Figure 9 shows the cam rod as viewed from the lower edge of Figure 7. Considering these two views together, it will be observed that the central portion of the cam extends between points on the lines B and E, lies in a horizontal plane, and is concentric with the axis of the rotary table 42. The central portion of cam 70 has a metal strip 185 welded to its underside and which strip is secured to the inner portion of the work table 30. The horizontal plane in which the central portion of cam 70 lies is best illustrated in Figure 6, from which it will be observed that the rod lies sufficiently below the upper surface 32 of table 30 that the rod will be engaged by the wheel 68 of a container support 44 while the latter is in upright position. At the time that a wheel 68 is engaging the central portion of cam rod 70, the roller 64 on the container support 44 will be in engagement with the central portion 66c of the inner cam plate 66.

Referring to Figures 7 and 9, with the rotary table 42 moving in a clockwise direction, the portion 70a of cam rod 70 which controls downwardly tilting movement of the container supports 44 extends to the left from the central portion of the cam. That is, beginning at point B, the cam rod spirals downwardly and somewhat outwardly as viewed in top plan to the point B'. Then it spirals inwardly and downwardly to the point C. In other words, from point B to point C the cam rod follows a helical path which extends along the path of a downwardly tilting container support 44. In more detail, the cam rod follows or defines the helical path along which the outer periphery of roller 68 will pass as the container support is tilting downwardly from the position shown in Figure 6 to a position such as illustrated at the right of Figure 2.

It will be observed from Figure 10 that the portion 70a inclines downwardly at a much steeper angle than the portion 70b. This arrangement will cause the container to be moved to inverted position as quickly as possible so that spinning will quickly start and before syrup reaches the capped end of the container.

The downwardly inclined portion 70a of cam rod 70 has an arcuate skirt 185 secured to its undersurface by welding and a horizontal flange 186 integral with this skirt is secured to the base of the machine to thereby support the cam.

The portion 70b of cam rod 70 shown at the right of Figures 7 and 9 is a more gradual decline from the central portion than the portion 70a so that containers will be uprighted less quickly than they are initially inverted. Figure 10 shows the portion just referred to as viewed looking toward Figure 9 from the right and indicates the difference in sharpness of inclination. As is shown in Figures 7, 9 and 10, the extreme end portion 70d is substantially horizontal and concentric with the table axis so that a wheel 72 will come into gradual contact therewith. This portion will also lie in such position under the spinning disc 52 that a wheel 72 cannot strike the butt end of the cam. A second skirt element 185 with flange 186 supports the portion 70b of the cam rod.

As shown in Figures 1 and 7, in order to lubricate the surface of the spinning disc 52 which is engaged by the spinning wheels 72, as well as the cam rod 70 and the rollers 68 which engage it, the machine may be fitted with a lubricant reservoir 190 secured to the inner side of the stationary table 30. A tube 191 extending from the reservoir drops oil upon a roller 192 shown in detail in Figure 14. As is clear from the latter figure, roller 192 is formed of suitably absorbent material and is rotatably mounted on a pin 193 depending from the outer end of a lever 194. Lever 194 is rotatable about a stud 195 mounted in a bracket 196 secured to the table 30. A spring 197 surrounding stud 195 urges the arm 194, and thereby roller 192, in a clockwise direction as viewed in Figure 1. Roller 192 lies in the horizontal plane through which the spinning wheels 72 move when they reach the line B. Spring 197 urges the roller 192 into contact with each spinning wheel 72 as the latter passes the roller and lubricant is thereby wiped on the wheels. Such lubricant will be applied to the periphery of the large spinning disc 52 by the wheels 72. In addition, lubricant will work downwardly upon the roller 68 when the container support is upright to thereby lubricate the roller 68 which engages the cam 70. In this way, cam 70 will be lubricated as well as the spinning wheels and disc 52.

In Figure 5 a modification of the lubrication arrangement is illustrated. This involves a tube 191a leading from reservoir 190 to a point above cam rod 70 and adjacent line B. Oil dropping on the cam will be picked up by the wheels 72 with the same result as the system described above.

The brake 76 is illustrated in Figures 17 to 19 from which it will be observed that the brake dial is rotatable upon a pin 200 mounted at the outer end of a lever 201. Intermediate its length, lever 201 includes a cup portion which is pivotally mounted upon a pin 202 carried in a bracket 203 secured adjacent its inner end 204 to the stationary table 30 of the machine. The inner end 205 of lever 201 has a stud 206 pivotally connected thereto and which stud extends through a lug 207 extending upwardly from bracket 203. A spring 208 is positioned between the outer surface of lug 207 and a stop washer 209 and lock nuts secured to the outer end of stud 206. Spring 208 urges lever 201 in a counterclockwise direction about its pivot 202 with the result that the brake dial 76 is urged inwardly along a line radially of the axis of table 42.

It will be perceived that by the foregoing construction, the container supports will be downwardly tilted at relatively high speed as they follow the course defined between the outer left-hand portion 66a of cam plate 66 and the left-hand portion 70a of cam rod 70. Cam plate 66 will urge the container supports from upright position to initiate their tilting, but the tilting will be finally controlled by the cam rod 70 so that the container support will be smoothly tilted during high speed rotation of table 42 until spinning wheel 72 engages the spinning disc 52. As is indicated at the right of Figure 2, the extent of contact of the spinning wheel 72 with the driven spinning disc 52 is limited because a wear stud 210a (Figure 11) secured to the base of the container support housing 155 will come into contact with the lower end of the stop screw 134 associated with that container support. A plate 210 closes the lower end of housing 155 to prevent water from reaching the interior thereof.

When a container support 44 comes adjacent the end 70d of cam rod 70 shown at the right of Figures 7 and 9 and lying at point D, engagement of the roller 68 with the cam rod will cause the container support to be lifted. When the container support is in almost upright position, its roller 64 will engage the portion 66b of cam plate 66 and the latter will coact with cam rod 70 to finally control the uprighting movement of the container support. When the container support reaches upright position, its band 74 will engage one of the pockets of the brake dial 76 and because the dial is formed of frictional material, the rotation of the bottle continuing from the action of the spinning disc 52 will be stopped. However, as has been mentioned above, the contents of the bottle will continue to spin, thereby thoroughly wiping all syrup from the interior of the bottle. Immediately thereafter, engagement of the roller (Figure 6) 148 of the container support with the upwardly inclined infeed end of the cam 63 will cause the clamping arm 48 to be raised so that the bottle will stand free upon the container support in readiness for removal by outfeed dial 78.

The bottles will be substantially inverted and spun by positive engagement with spinning disc 52 during about 105° of their rotation with table 42. With the machine operating to handle 150 six ounce bottles per minute, the duration of positive spinning at 2,000 R. P. M. will be about seven seconds. The bottles are moving from upright position to inverted position during about 60° of the rotation of table 42 and are moving from inverted to upright position during approximately 90° of the rotation of table 42.

The terminology used in the specification is for the purpose of description and not of limitation, the scope of the invention being defined in the appended claims.

We claim:

1. In a mixing apparatus, a base, a table rotatable with respect to said base about a vertical axis, container supports mounted on the periphery of said table and tiltable vertically between upright and inverted positions radially of the table, said container supports including upper and lower rotary container clamping members, means carried by said base to deliver containers to and remove them from said supports, a disk below and coaxial with said table, said disk being rotatable with respect to said base, the lower container clamping member including a wheel adapted to contact with said disk when the container supports are substantially inverted, means to rotate said table and disk so that the disk will rotate more rapidly than the table so as to spin a container clamped between said clamping members, and a cam fixed to said base to engage the lower clamping members of said container supports to thereby control the position of said container supports, said cam including a horizontal portion extending through the part of the path of rotation of said table during which container supports are upright and opposite said container delivering and removing means, said cam also including a helix portion at each end of said horizontal portion, said helix portions respectively extending throughout the portions of the path of rotation of said table during which said container supports are moving to inverted position and are being restored to upright position, the helix portion which inverts said container supports being more sharply inclined than the helix portion which uprights said container supports.

2. A mixing apparatus of the character described in claim 1 wherein said cam is of rod-like form.

3. In a mixing apparatus, a base, a table rotatable with respect to said base about a vertical axis, a container support mounted on the periphery of said table and tiltable vertically between upright and inverted positions radially of the table, said container support including upper and lower rotary container clamping members, a disk below and coaxial with said table, said disk being rotatable with respect to said base, the lower container clamping member including a wheel adapted to contact with said disk when the container support is substantially inverted, a pair of container support tilting cams fixed to said base, corresponding points on said cams being opposed in planes radial of said table, said cams extending along a portion of the path of rotation of said table, and means to rotate said table and disk so that the disk will rotate more rapidly than the table so as to spin a container clamped between said clamping members.

4. A mixing apparatus of the character described in claim 3 wherein the respective container support tilting cams are arranged to engage diametrically opposite points on the container support and which points lie on lines extending radially of said table.

5. A mixing apparatus of the character described in claim 3 wherein the respective container support tilting cams are arranged to engage diametrically opposite points on the container support and which points lie on lines extending radially of said table, and a pair of rollers journalled on said container support to respectively engage said cams.

6. A mixing apparatus of the character described in claim 3 wherein one of the tilting cams comprises a plate-like element fixed to said base above said table and the effective surface of the other cam defines a helix extending along the path of tilting and rotary movement of the container support with said table.

7. A mixing apparatus of the character described in claim 6 wherein the first-mentioned cam is of convex form in a horizontal plane and includes laterally projecting end portions.

8. A mixing apparatus of the character described in claim 6 wherein the first-mentioned cam extends through approximately 90° of the rotation of said table and the second cam extends through approximately 180° of the rotation of said table.

9. A mixing apparatus of the character described in claim 6 wherein the second-mentioned cam is of rod-like form.

10. In combination, a base table including an upper horizontal surface, a pocketed dial rotatable above said surface of the table about a vertical axis, a container supporting conveyor having its upper run movable toward and past said dial in the plane of said table surface and in a direction substantially tangential with respect to said dial so as to move containers toward said dial, a cylindrical member extending alongside said conveyor run at the side thereof opposite said dial, said member being journalled for rotation about a horizontal axis parallel to the direction of movement of said conveyor and having its circumferential surface provided with a helically extending recess formed on a pitch which increases toward said dial, the minor diameter of the recess decreasing from its inlet end toward the dial to define a line lying at a slight angle to the direction of movement of said conveyor run, guide means on the dial side of said conveyor to direct a container into the recess of said member and including a container engaging surface lying in a vertical plane parallel to said line defined by the minor diameter of the recess, and means to drive said cylindrical member and dial in synchronism and to drive said conveyor at a faster linear speed than said member.

11. The combination described in claim 10 wherein the line defined by the minor diameter of the recess of said cylindrical member lies at an angle of approximately six degrees to the direction of movement of said conveyor.

12. The combination described in claim 10 wherein said guide means is pivoted on a vertical axis and is spring urged toward said cylindrical member.

13. The combination described in claim 10 wherein the end of the cylindrical member adjacent said dial has a periphery generated by an arcuate line concentric with the circumference of said dial.

14. The combination described in claim 10 wherein said driving means includes a removable drive element.

15. The combination described in claim 10 wherein said cylindrical member is adjustable with respect to said drive means.

16. The method of mixing by spinning the contents of a sealed container filled with carbonated water and a syrup which comprises moving the container through a predetermined mixing path and inverting the container from the upright position in which it was filled and in which position the syrup is still undisturbed and below the water, inverting the container during the initial portion of its travel in said path so as to initiate endwise flow of the syrup along one wall of the container, spinning the container about its longitudinal axis at high speed, with such spinning movement being initiated when the container reaches substantially inverted position but before movement of the syrup endwise of the container brings the syrup to the lowered end of the container, and then uprighting the container.

17. In combination, a base table including an upper horizontal surface, a pocketed infeed dial rotatable above said surface of the table about a vertical axis, a table rotatable with respect to said base about a vertical axis, container supports mounted on the periphery of said table and tiltable vertically between upright and inverted positions radially of the table, said container supports including rotary container clamping members, a disk below and coaxial with said table, said disk being rotatable with respect to said base, a pocketed outfeed dial rotatable above said horizontal surface of the base table about a vertical axis, a plurality of shafts respectively secured to said dials and said rotary table, a plurality of sprocket wheels, one carried by each of said shafts, all of said sprocket wheels lying in the same horizontal plane, said shafts being arranged at the apices of a triangle, a motor driven shaft having a sprocket wheel fixed thereto and in said plane, and a pair of shaft-carried idler sprockets also lying in said plane and outside of the triangle formed by said three first-mentioned shafts, a sprocket chain engaging all of said gears, a second motor driven shaft provided with a horizontally disposed driven pinion, and a gear fixed to said disk, said motor driven pinion and said gear being operatively connected.

18. The combination described in claim 17 including rotary means to deliver containers directly to said infeed dial, and means to drive said last-mentioned means from the shaft of said infeed dial.

19. The combination described in claim 17 including rotary means to deliver containers directly to said infeed dial, means to drive said last-mentioned means from the shaft of said infeed dial and including a removable element.

20. In an apparatus of the character described, a container support including a housing, a container engaging element including a hub portion rotatable in said housing, a container platform, and a circular friction element adapted to have driven engagement with a driving element to thereby rotate said container engaging element with respect to said housing, and means to removably secure said platform and friction element to said hub portion.

21. In combination, a base, a table rotatable upon said base about a vertical axis, a plurality of container supports pivoted for movement radially of said table and including rotatable container engaging elements, a brake element mounted on said base including a bracket fixed to the base, a lever including an inverted cup portion intermediate its length and journalled on a pin projecting upwardly from the bracket, a brake shoe positioned on the end of the lever adjacent the path of movement of said container engaging elements, a horizontal pin pivotally connected to the opposite end of said lever to extend through said bracket and provided with a stop shoulder at its free end, and an expansible spring positioned between the shoulder and said bracket.

22. In combination, a conveyor for upright containers, a rotary dial to receive containers from the conveyor, and guide means positioned in advance of said dial and above the conveyor to direct containers in an offset path with and upon the conveyor, said means being positioned at a height above the conveyor which is less than the diameter of the containers.

23. The combination described in claim 22 wherein said means comprises two members, one of which is at one side of the conveyor and has a face which is convex to extend toward the median line of the conveyor and the other member is on the opposite side of the conveyor and is recessed opposite the convex face of the first member.

CARL L. DAY.
LEO F. PAHL.

REFERENCES CITED

The following references are of record in the file of this patent:

UNITED STATES PATENTS

| Number | Name | Date |
| --- | --- | --- |
| 2,086,273 | Kantor et al. | July 6, 1937 |
| 2,117,226 | Steward | May 10, 1938 |
| 2,216,090 | Newton | Sept. 24, 1940 |
| 2,274,245 | Newton | Feb. 24, 1942 |
| 2,290,562 | Kantor | July 21, 1942 |
| 2,295,114 | Kantor | Sept. 8, 1942 |
| 2,297,154 | Kantor | Sept. 29, 1942 |